Patented Feb. 5, 1952

2,584,835

UNITED STATES PATENT OFFICE 2,584,835

PREPARATION OF STABLE ALKYL POLYSILOXANE RESINS

Auguste Florentin Bidaud, Serezin-du-Rhone, and Louis Ceyzeriat, Lyon, France, assignors to Societe Des Usines Chimiques Rhone-Poulenc, Paris, France, a French body corporate No Drawing. Application October 7, 1946, Serial No. 701,618. In France March 26, 1946

3 Claims. (Cl. 260—33.6)

This invention is for improvements in or relating to the production of organic silicon resins known as silicones, and more particularly of those silicones in which the organic radicals attached to the silicon are methyl or ethyl groups.

It is known to prepare silicones, in which organic radicals and hydrolysable substituents, such as chlorine atoms or alkyloxy groups, are attached to the silicon. Such compounds may be obtained by causing organic magnesium halides to act on silicon tetrachloride or on alkyl silicates, or by direct reaction between a halogenated hydrocarbon and silicon. According to the number of hydrolysable substituents, the reaction products give by hydrolysis mono-, di- or trihydroxysilicanes, and these latter compounds on condensation with the elimination of the elements of water give the required silicones.

The appearance and properties of the products obtained vary according to the nature and number of the substituents. In the case of the products obtained from dihydroxysilicanes, the methyl and ethyl derivatives appear in the form of more or less viscous liquids, insoluble in water but soluble in organic solvents, such as diethyl ether, benzene and ethyl alcohol. When subjected to the action of heat, these products remain liquid.

The products obtained from trihydroxysilicanes, however, have different properties. The ethyl derivative is generally a gum or resin, which, under the action of heat, is converted into a brittle and friable, insoluble and infusible solid. This transformation, furthermore, takes place in a short time even at the ordinary temperature. The instability of the methyl derivative is still greater and, during its preparation, the product isolated is normally insoluble and infusible or rapidly becomes so.

In practice, mixtures containing both the di-substituted derivative and the tri-substituted derivative occur. Such products are obtained, for example, from the hydrolysis of alkylchlorosilicanes, obtained for example by reacting between 1 and 2 mols. of alkyl magnesium halide with 1 mol. of silicon tetrachloride.

The properties of these mixtures vary according to the relative proportions of their constituents or, in other words, according to the ratio of the number of alkyl groups to the number of silicon atoms. Thus, a silicone containing 1.8 ethyl groups or more per silicon atom remains liquid on prolonged heating at 250° C., whereas a silicone containing 1.5 ethyl groups per silicon atom may be rendered hard and insoluble by heating for 30 minutes at the same temperature. By reducing the number of ethyl groups per atom of silicon, thermo-setting takes place more rapidly or at a lower temperature, and the resistance of the resin to heat increases, which represents valuable technical advantages; unfortunately, it is found that silicones containing less than 1.5 ethyl groups per atom of silicon no longer possess sufficient stability on storage for practical utilisation. Thus, a resin with 1.25 ethyl groups per atom of silicon, which when freshly prepared has the form of a viscous liquid soluble in various organic solvents, is converted by storage for one or two months at room temperature into a mass which is hard, infusible and insoluble, and which is, therefore, practically useless.

The replacement of ethyl groups by methyl groups makes it possible to obtain products which harden more rapidly under the action of heat; unfortunately, instability is still more pronounced, and a resin containing 1.5 methyl groups for 1 atom of silicon is definitely unstable; a resin containing 1.25 methyl groups, even if isolated with precaution (removal of solvent at a low temperature), becomes insoluble and infusible in a few days or sometimes a few hours, at room temperature.

The instability on storage of slightly substituted ethyl and methyl silicones has, in fact, constituted heretofore the only serious obstacle to their technical utilisation, since their otherwise valuable properties: excellent resistance to heat, due to their high silicon content, dielectric properties, water-repelling properties, should render them preferred materials for numerous applications, for example as varnishes, paints, insulating materials, binding agents and moulding materials.

It is among the objects of the present invention to provide a process for converting unstable silicones of the class consisting of the methyl and ethyl compounds and mixtures thereof, into products which are stable even after prolonged storage. A further object is to provide new silicones, including products derived from unstable methyl and ethyl silicones containing less than 1.5 alkyl groups per silicon atom, which are characterised by stability on storage at normal temperature both as to appearance and to solubility in organic solvents.

These objects are achieved by thermal treatment in an organic solvent medium of a product selected from the class consisting of unstable methyl and ethyl silicones and mixtures thereof.

The temperature employed varies with the working conditions and particularly with the nature of the solvent. For example, a resin which necessitates for stabilisation heating for 18 hours at 85° C. in benzene, is stabilised by heating for the same length of time at 125° C. in diethyl ether. In practice, a temperature of at least 75° C. appears necessary, which, if a solvent of low boiling point is used, necessitates working under pressure. The duration of heating is likewise variable and, for each particular case, the most favourable conditions of temperature and duration are determined by preliminary trial.

Usual solvents, such as benzene and butyl acetate, are quite suitable and have the advantage of forming with water an azeotrope, which separates into its constituents after condensation, thus permitting the removal of the water by decantation and the recovery of the solvent. The quantity of water removed in carrying out the treatment according to the invention represents, furthermore, only a very slight percentage of the initial weight of the primary resin treated.

The process of the present invention is illustrated by the following non-limitative examples in which the parts stated are by weight:

EXAMPLE I

*Preparation of an ethyl silicone*

An ethereal solution, about 1.25 normal, of 73 parts of ethyl magnesium bromide is gradually added, while stirring, to a solution of 85 parts of silicon chloride in anhydrous diethyl ether. After reaction, the product is hydrolysed by pouring the mass over a period of half-an-hour into ice water, while stirring and cooling. The ethereal solution is decanted, washed, neutralised with a weak solution of sodium bicarbonate and concentrated until it contains about 50% of silicone, when a little more than one and a half times its volume of benzene is added; the ether is removed by distillation. The benzene solution is then heated under a reflux condenser and, by means of a suitable known device, the water separated from the azeotrope after condensation is removed from the circuit. After about 5 hours of reflux distillation, a quantity of water corresponding to about 5% of the silicone will have separated. The treatment is then stopped, and the benzene is removed by distillation in vacuo. The resulting silicone has the form of a thick balsam which is capable of being drawn out and is soluble in organic solvents (ethyl alcohol, benzene, etc.) and of which neither the appearance nor the solubility changes after storage for more than a year. Subjected to the action of heat, for example at 225° C., the silicone hardens rapidly. Mixed with about three times its weight of a suitable filler (calcium carbonate, for example), it forms, preferably with the addition of a small quantity of ethyl alcohol, a paste which may be used for the automatic machine fixing of electric bulbs to their base caps.

If, after concentration of the ethereal solution, the removal of the ether is carried out, even in vacuo, without the addition of benzene and without subsequent heat treatment of the benzene solution, the silicone is obtained in the form of a viscous liquid which is soluble in organic solvents, and which in less than two months is transformed into a hard, insoluble and infusible product.

EXAMPLE II

*Preparation of a methyl silicone*

The process is carried out as in Example I, the ethyl magnesium bromide being replaced by the equivalent quantity of methyl magnesium bromide. Half its volume of benzene is added to the ethereal solution. After this addition, the ether is removed by distillation, at the end under reduced pressure in order not to exceed 50° C. Then, under normal pressure, boiling is continued for 18 hours, a suitable device permitting the return of the benzene after separation of the small quantities of entrained water. Finally, the solvent is removed in vacuo at 50° C. There remains a solid, hard, friable and fusible material, which is soluble in organic solvents and which does not change with storage at room temperature. When heated to 200° C. it becomes rapidly insoluble. This resin may be used as a basis for the preparation of heat-resistant paints, varnishes or waterproof coatings.

By way of comparison, the ethereal solution, without the addition of benzene, was subjected to various treatments, with the results indicated below:

(a) Distillation on the water bath at the ordinary pressure. A horny, hard, brittle and infusible material is left, which is insoluble in organic solvents and is useless.

(b) Rapid distillation in vacuum, without exceeding 50° C. A resinous, fusible and soluble product is left which, at the ordinary temperature, becomes in a few hours hard, insoluble and infusible.

(c) As (b), but after heating for 18 hours under a reflux condenser. The product becomes insoluble after one day's storage.

We claim:

1. A process for the preparation of thermosetting alkylpolysiloxane resins stable at room temperature and containing less than 1.5 alkyl groups per silicon atom, the said alkyl groups being identical, being the sole organic groups and containing less than three carbon atoms, which comprises hydrolyzing in a solvent medium and in the presence of water, an alkyl-halogeno-silicane containing less than 1.5 alkyl groups per silicon atom, the said alkyl groups being identical, being the sole organic groups and containing less than three carbon atoms, neutralizing the solution of the hydrolysis products thus obtained to produce a solution containing the hydrolyzed product and water, and subjecting the products of hydrolysis, in a medium consisting solely of the said products, an organic solvent for the thermally treated products, and the water, to thermal treatment at a temperature of at least 75° C., for a period of time sufficient to effect stabilization of said products and to remove water, the hydrolysis products being maintained continuously in solution from the time of their formation to the end of the thermal treatment.

2. A process according to claim 1 wherein the said organic solvent is one capable of forming an azeotrope with water.

3. A process for the preparation of thermosetting alkylpolysiloxane resins stable at room temperature and containing less than 1.5 alkyl groups per silicon atom, the said alkyl groups being identical, being the sole organic groups and containing less than three carbon atoms, which comprises hydrolyzing in an ethereal medium and in the presence of water an alkyl-halogeno-silicane containing less than 1.5 alkyl groups per silicon atom, the said alkyl groups being identical, being the sole organic groups and containing less than three carbon atoms, neutralizing the solution of the hydrolysis products thus obtained to produce a solution containing the hydrolyzed product and water, replacing the ether by benzene and subjecting the resulting medium, consisting solely of the said hydrolysis products, benzene and the water, to thermal treatment at a temperature of at least 75° C. for a period of time sufficient to effect stabilization of said products and to remove the water, the hydrolysis products being maintained continuously in solution from the time of their formation to the end of the thermal treatment.

AUGUSTE FLORENTIN BIDAUD.
LOUIS CEYZERIAT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,375,998 | McGregor et al. | May 15, 1945 |
| 2,383,827 | Sprung | Aug. 28, 1945 |
| 2,389,477 | Wright et al. | Nov. 20, 1945 |
| 2,450,594 | Hyde | Oct. 5, 1948 |
| 2,456,627 | Doyle | Dec. 21, 1948 |
| 2,470,497 | Lamoreaux | May 17, 1949 |
| 2,483,209 | Lamoreaux | Sept. 27, 1949 |

FOREIGN PATENTS

| Number | Country | Date |
|---|---|---|
| 572,230 | Great Britain | Sept. 28, 1945 |

OTHER REFERENCES

Rochow: Chemistry of the Silicones, Wiley, 1946, pp. 93 to 95.